United States Patent [19]

Suzuki et al.

[11] Patent Number: 5,029,985
[45] Date of Patent: Jul. 9, 1991

[54] MULTILAYER LIQUID CRYSTAL DISPLAY DEVICE

[75] Inventors: Takumi Suzuki, Machida; Hisao Takahashi, Atsugi, both of Japan

[73] Assignee: Ricoh Company, Ltd., Tokyo, Japan

[21] Appl. No.: 353,028

[22] Filed: May 17, 1989

[30] Foreign Application Priority Data

May 19, 1988 [JP] Japan .................... 63-6512[U]
Jan. 9, 1989 [JP] Japan ........................ 1-1267

[51] Int. Cl.⁵ ............................................. G02F 1/13
[52] U.S. Cl. ................................ 350/335; 350/334; 350/344
[58] Field of Search ............... 350/335, 344, 334, 343

[56] References Cited

U.S. PATENT DOCUMENTS 4,425,030 1/1984 Schmidt ..................... 350/339 R
4,547,043 10/1985 Penz .............................. 350/335

FOREIGN PATENT DOCUMENTS 60-153025 8/1985 Japan ........................ 350/344
61-67830 4/1986 Japan ........................ 350/344

Primary Examiner—Rolf Hille
Assistant Examiner—Minhloan Tran
Attorney, Agent, or Firm—Oblon, Spivak, McClelland, Maier & Neustadt

[57] ABSTRACT

The present invention discloses a multilayer liquid crystal display device which has superposed liquid crystal panel units having plastic film substrates. Spacers of a size not larger than 50 μm are dispersed on and fixed to one viewing area of the facing panel units to prevent contact between adjacent units and even when the viewing area of the device is large and/or even when the device is left alone under bad conditions, no Newton ring, no optical interference fringe or no uneven transmission are recognized on the display screen of the device.

6 Claims, 3 Drawing Sheets

MULTILAYER LIQUID CRYSTAL DISPLAY DEVICE

BACKGROUND OF THE INVENTION

The present invention relates to a multilayer liquid crystal display device comprising superposed crystal panel units having plastic film substrates and spacers in a size of not larger than 50 $\mu$m dispersed over a surface of a viewing area of each unit.

So far, when a multilayer liquid crystal display device (hereinafter referred to as "LCDD") is fabricated by superposing two or more single liquid crystal panel units (hereinafter referred to as "LCPU") having glass plate substrates, fixing parts, for example, double-sided adhesive tape, of a required thickness are disposed between inner periphery portions of each panel unit to prevent contact between any one the units and a generation of Newton rings, as disclosed, for example, in Japanese Patent Application Laid-Open (KOKAI) No. 54-95,200 (1979).

However, a multilayer LCDD prepared by superposing two or more LCPU having glass plate substrates has defects, namely, (1) large thickness (2) heavy weight and (3) weakness against impact. In order to improved these defects, a multilayer LCDD prepared with a LCPU having plastic film substrates in place of glass plate substrates have been strongly requested. This type of LCDD has many better properties, such as being, thinner, lighter in weight, stronger in impact and much more flexible than the one having glass plate substrates and in view of the improvements, the expectation for the possible realization of a device having a large viewing area and/or a curved surface has increased so far.

The structure and the problems of a LCPU having plastic film substrates (hereinafter referred to as "plastic film LCPU") and a multilayer LCDD prepared by superposing LCPUs are explained referring to FIGS. 1 to 9 attached hereto.

In the Drawings, FIGS. 1 to 5 show a multilayer LCDD of the present invention and FIGS. 6 to 9 show a conventional LCDD prepared with plastic film LCPU.

FIGS. 2 and 6 are a perspective view of a liquid crystal display device having two-layer superposed panel units. FIG. 3 is a cross section view along the line I—I of FIG. 2. FIG. 4 is a cross section view along the III—III of FIG. 2. FIG. 7 is a cross section view along the line V—V of FIG. 6. FIG. 8 illustrates a bad situation caused by a contact of panels 1 and 2. FIG. 9 illustrates a bad appearance in a viewing area of FIG. 8.

Numerals in the Figures denote as follow:
1 a panel unit having spacers,
2 a panel unit not having spacers,
3 a fixing part fixing superposed two units, 1 and 2, and simultaneously maintaining the two units not to contact each other in the viewing areas,
4 an air layer between superposed two units, for example, 1 and 2,
5 a spacer of the present invention,
6 a polarizer,
7 a plastic film substrate,
8 a liquid crystal layer, having particles to maintain clearance between substrates in uniform value (the particles are referred to, hereinafter, as "gap particles"),
9 a sealing material (printed),
A a viewing area.

Each unit has two layers of oriented plastic film substrates 7 provided with transparent electrodes. Gap particles having a size of not more than 10 $\mu$m are dispersed on one surface of the one substrate and sealing materials 9 are printed on a peripheral portion of one surface of the other substrate. The surface dispersed with gap particles and the surface printed are stuck together. Liquid crystal is then poured through an inlet prepared in advance into a space between the stuck surface of the substrate and the inlet is then sealed. Polarizers 6 are stuck to each outer surface of the substrates of the intermediately assembled unit and thus completing a LCPU. Two LCPUs 1 and 2 are stuck together with a pair of fixing parts 3, functioning also as spacers, for example, a double-sided adhesion tape, disposed outside of viewing areas A of the surfaces opposite to each other.

If the two-layer LCDD of this type has a size not larger than that of a handhled card type calculator or an IC card, substantially no problem may occur, on the other hand, when the size is larger than about 90 mm × about 40 mm, namely, 2-line ×20-figure in structure, the following problems exist. Under normal conditions, even a conventional LCDD can maintain a constant space clearance between units, shown as an air layer 4 due to existence of the substrates 7, and rigidity of the thick polarizers 6, as shown in FIG. 7. However, when such a device is left under high-temperature and high-humidity conditions, the plastic film LCPUs are deformed due to the difference in expansion and contraction ratios between the substrate and the polarizer and the panel units 1 and 2 are prone to contact partially as shown in FIG. 8.

If an area of the contact is small, Newton rings or interference fringes would be recognized and make an appearance of the device worse.

When the area becomes larger, light scattering through the area contacted, which has no air layer inside, is different from that through the area not contacted. In other words, light transmission is higher at the contacted area than the area not contacted. The presence of areas different in light transmission greatly damages an appearance of the device. FIG. 9 illustrates this bad appearance. The contact region F is higher in light transmission than the non-contact region E. The bad appearance of uneven light transmission can be observed remarkably at driving when panel units 1 and 2 are negative panels.

Although the above description is made based on the panel units 1 and 2 having polarizers 6 on them, the same kind of bad appearance will also occur even when the units have no polarizers, for example, when guest-host liquid crystal units are multilayered. A similar bad appearance will occur also in a LCDD having three or more layer of units.

For this type of device, even if the fixing parts 3 are made thicker somewhat, the panel units 1 and 2 are greatly deformed since the substrates 7 are flexible and the contact occurs at the central portion of the viewing area A and no effect of improvement can be observed by thickening the fixing parts.

To prevent such contact, it is necessary to sufficiently increase the thickness of the fixing parts as a spacer responding to the size of the viewing area. Even in a device having a small viewing area such as 90×40 mm, the fixing parts 3 must have a thickness of more than 10 times that of a same size device having glass plate substrates.

This will not only impair the feature that a multilayer LCDD made of plastic film LCPU is thin, but also has no practical value because such a device sometimes is thickner than a display device with a glass plate substrate. Further, in a LCDD having a curved surface it is difficult to maintain the space between the LCPUs only with the fixing parts provided outside the viewing area.

The present inventors have extensively studied to removing the defects explained above, and have an idea to prevent such contact by placing spacers on a viewing area, which has not been able to think of because of the fear that such spacers would damage the uniform light transmission of the device. Accordingly, the inventors studies the size, dispersive density and the light transmission of the spacers deeply and achieved the present invention.

SUMMARY OF THE INVENTION

It is an object of the present invention to provide a multilayer LCDD of superposed plastic film LCPUs having no contact between the viewing areas of adjacent panel units, which would otherwise occur.

It is another object of the present invention to provide a multilayer LCDD of superposed plastic film LCPU, wherein many spacers of a size not more than 50 $\mu$m dispersed are fixed on and to one surface of adjacent units facing together to prevent contact between the viewing area of the adjacent panel units, which would otherwise occur.

It is a further object of the present invention to provide a multilayer LCDD which is thin, flexible, resistant to impacts, light in weight and free from the contact between tha viewing areas of adjacent panel units and from the bad appearance of the display device due to Newton rings and interference fringes or uneven light transmission in the viewing area of the device.

1 and 2 each liquid crystal panel unit;
3 fixing parts
4 an air layer between adjacent units;
5 spacers;
6 polarizers;
7 substrates;
8 liquid crystal layer containing gap particles which are not shown;
9 sealing materials (printed);
A a viewing area;
E an area not contacted; and
F an area contacted.

Figure 2:
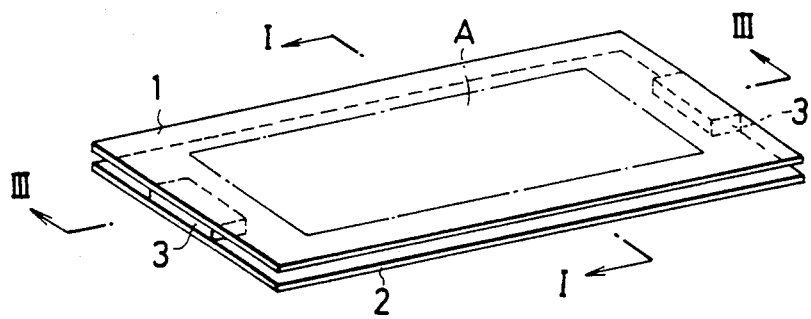
FIG. 2 is a perspective view of a LCDD having superposed liquid crystal panel units of FIGS. 1(a) and 1(b).

In FIG. 2, the spacers 5 are not shown. In the Figures except FIG. 3, the liquid crystal layer 8 is not shown.

DETAILED DESCRIPTION OF THE INVENTION

In a multilayer LCDD superposing not lens than two layers of plastic film LCPU by disposing fixing parts on peripheral portions of facing surfaces of the units, to achieve the objects described above, many five spacers of a size not larger than 50 $\mu$m are distributed on the viewing area of the surfaces of the units facing each other. Sizes of the spacers are not larger than the space between the units superposed and the spacers are fixed to one of facing surfaces between the units. As a method to fix the spacers, a method applying a static electricity or a method using an adhesive can be used.

The size of the spacers is to be not larger than 50 $\mu$m since the limit of recognition with human eyes is 50 $\mu$m. If the maximum size of the spacers is larger than 50 $\mu$m, the appearance of the display device will be damaged. The spacers may be spherical or cylindrical or can take on any other shape. The maximum size of the spacers is, (1) when their shape is spherical or near to spherical, the maximum diameter; and (2) when their shape is cylindrical or near to cylindrical, the maximum diameter or maximum height which is larger. Anyway, when the largest measurement of the shape is not larger than 50 $\mu$m, a spacer of any shape can be used. The spacer of the size 10 to 30 $\mu$m is preferable in view of its handling and efficacy.

Of course, the dispersion of the spacers is preferable if the dispersion is as uniform as possible. However, some unevenness can be permitted if the size of aggregated particles of the spacers are not larger than 50 $\mu$m. The dispersion density of the spacers is preferably 10 to 40 particles/mm$^2$.

However, the aggregation of the spacer particle is, in principle, not preferable. If the dispersion density of the spacer particles is too high, their probability of aggregation to the size larger than 50 $\mu$m increases whereas if the density is too low, the effect of preventing the contact between the units would be reduced undesirably.

It is necessary that the size of the spacers is not larger than 50 $\mu$m, as mentioned above, from a standpoint of a maximum size of particle recognizable by human eyes, but on the contrary, if the size is too small, it is necessary to increase the dispersion density from a standpoint of contact prevention, and it leads to increasing probability of particle aggregation which is not preferable.

An appropriate size of the spacers has a close relationship to their dispersion density and varies also depending on a size of the viewing area of the device. On the other hand, the thinner the device is, the more preferable it is and accordingly, it is generally requested that the space between the adjacent units be minimized. Although it is substantially insignificant to fix the ranges of size and dispersion density of the spacers numerically, preferable ranges are, if it is possible to say, 10 to 30 $\mu$m in size and 10 to 40 particles/mm$^2$ in dispersion density, as mentioned above.

Although low light transmission of the spacer at a wave length of 350 to 800 nm is preferable, for instance 10% or less, to prevent light scattering due to the spacers, spacers having a light transmission of about 90% still can be used.

As the materials for the spacers, in addition to the materials used in the following Example, pulverized and screened styrene-acryl copolymer or polymethyl methacrylate can be used.

A shape of the spacers can be spherical, cylindrical or take any other form, as long as their sizes are not more than about 50 μm because the upper limit of recognizable size by human eyes is 50 μm. Low light transmission of the spacers is preferable in order to prevent light scattering.

The multilayer LCDD with superposed plastic film LCPUs according to the present invention can avoid the occurrence of Newton rings, optical interference fringes due to a deformation of the LCPUs and a bad appearance of the device produced by uneven light transmission due to contact of the panel units even when it is used under high-temperature, high-humidity conditions. The device of the present invention can also be used in a curved shape or can change its form to a curved state during its use since the spacers of the present invention keep the space between the adjacent units. Accordingly, the device of the present invention has many advantages as described above and is also highly reliable in a practical use.

It is well known that gap particles are used in a space between the substrates of a LCPU at a viewing area to adjust the thickness of the liquid crystal layer. The gap particles are used within the liquid crystal layer and their object of use, size, required properties and dispersion density are different from those of the spacers of the present invention and furthermore, are fundamentally different in concept from the spacers used in the present invention.

For example, the object of use of the gap particles in a LCPU is to have a uniform thickness of the liquid crystal layer and the size of the gap particle is 2 to 10 μm, which is determined by a required thickness of the liquid crystal layer, usually 5 μm or less, and is necessary to be controlled strictly up to an order of submicrons.

Further, since the particles are used within the liquid crystal layer, the particles which are chemically resistant to the liquid crystal, namely, which do not pollute nor dissolve in the liquid crystals shall be selected.

EXAMPLE

Figure 1A:
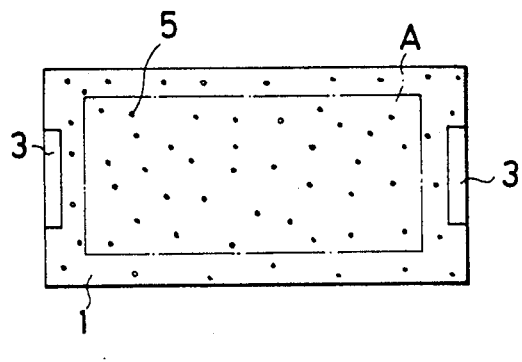
FIGS. 1(a) and 1(b) are plain views of each LCPU to be superposed.
Figure 1B:
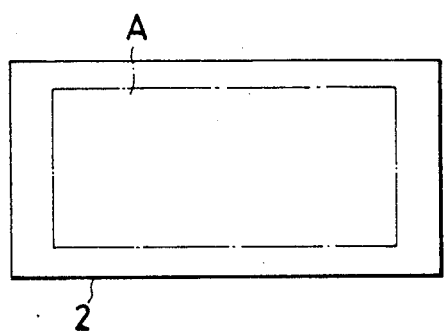
Figure 3:
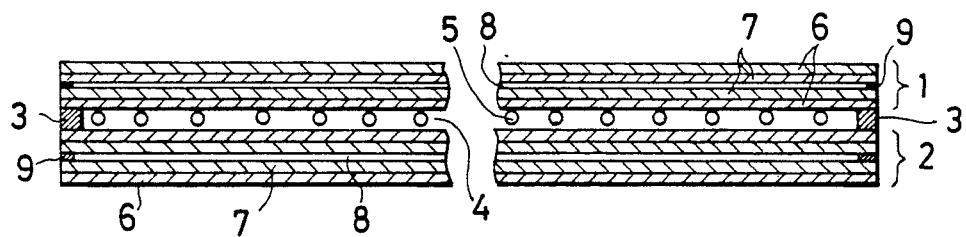
FIG. 3 is a cross section view along the line I—I of FIG. 2.
Figure 4:
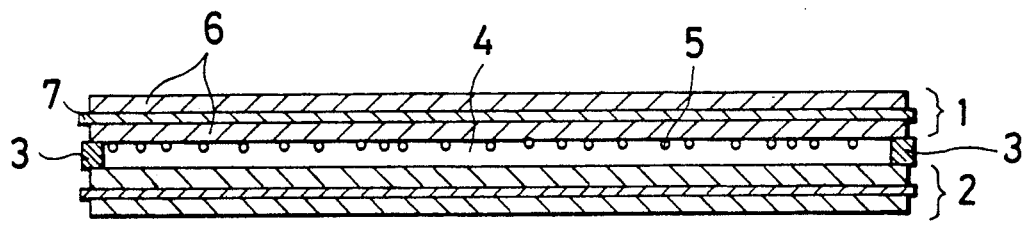
FIG. 4 is a cross section view along the line III—III of FIG. 2.

An Example of the present invention will now be described with reference to the drawings. FIGS. 1(a) and 1(b) show two liquid crystal panel units 1 and 2. Referring to FIG. 3, each unit 1 and 2 respectively has two layers of oriented polyethylene telephthalate film substrates 7 of 0.1 mm thick provided with transparent electrodes. Gap particles ar dispersed on one surface of the one substrate and sealing materials 9 are printed on a peripheral portion of one surface of the other substrate. The surface dispersed with gap particles and the surface printed are stuck together. Liquid crystal is then poured through an inlet, prepared in advance, into a space between the stuck surfaces of the substrate and the inlet is then sealed. Polarizers 6 of about 0.2 mm thick, having an adhesive on them, are stuck to each outer surface of the substrates and thereby complete the LCPUs 1 and 2. The manufacturing process of the panel units, so far described above, is the conventional one.

Just before the two LCPUs 1 and 2 are superposed, spacers 5 are dispersed on one surface of the unit 1 facing the unit 2 [see FIG. 1(a)]. The spacers 5 used are spherical fine particles of a rigid polymer having a particle size of about 14 μm in diameter and a light transmission of 86%, (MICROPEARL® SP 214: cross-linked copolymer mainly comprising divinylbenzene; manufactured by SEKISUI FINE CHEMICAL Company Ltd.). Another MICROPEARL BB 31490 (also manufacture by SEKISUI FINE CHEMICAL Company Ltd. size in diameter: 14.9 μm; a light transmission at a wave-length of 350 to 800 nm; 0%), which has a black surface obtained by secondary processing MICROPEARL SP 214, was used as the spacer in another experiment. By the secondary processing, surface of SP 214 changed to black and absorbed light of a wavelength in a predetermined range. The light transmission at the wave length is 0%.

As the method to disperse spacers 5 on a surface of the unit 1, a dispersion of 0.1 g of the spacers in 100 ml of FREON TE (1 mg spacers/1 ml of Freon) was coated on the surface with a brush. Resulting dispersion density was 10 to 30 particles/mm².

A pair of double-side adhesion tape of 0.2 mm thick, as fixing parts 3, was disposed at peripheral portions outside of a viewing area A of the unit 1. The units 1 and 2 are fixed together by adhering with the tapes, as is shown in FIGS. 2 and 3.

Figure 5:
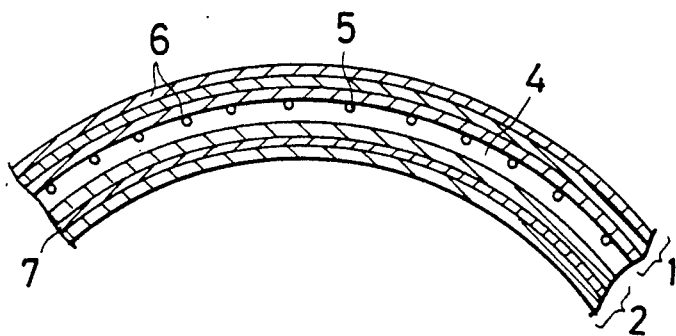
FIG. 5 is a cross section view of a multilayer LCDD of the present invention, showing a curved state of the device.
Figure 6:
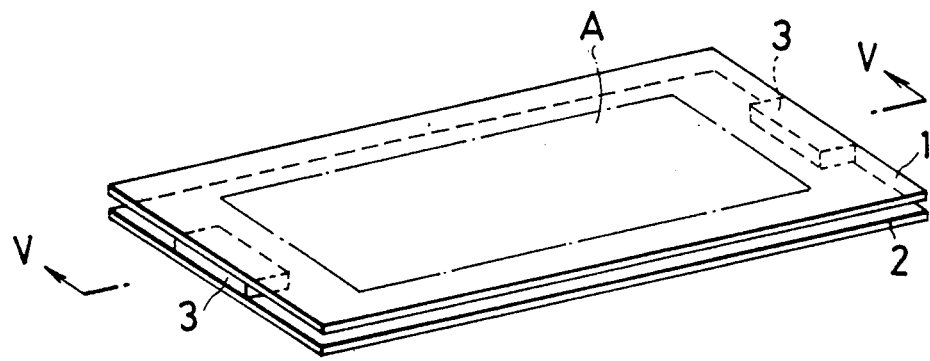
FIG. 6 is a perspective view of a conventional multilayer LCDD.
Figure 7:
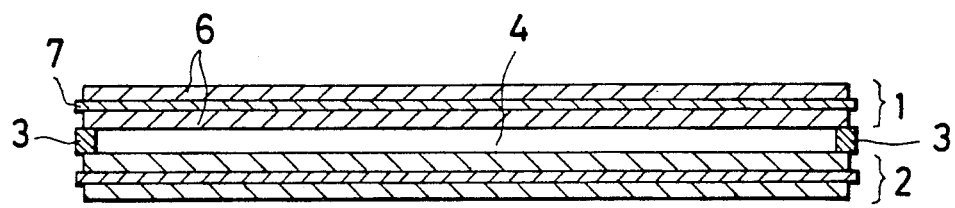
FIG. 7 is a cross section view along the line V—V of FIG. 6.
Figure 8:
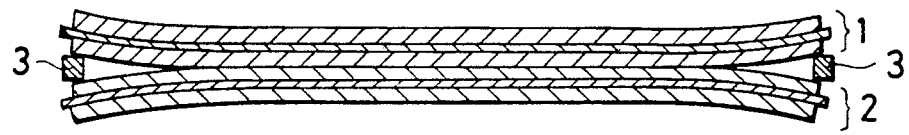
FIG. 8 is a cross section view of a conventional device deformed under high-temperature and high-humidity conditions.
Figure 9:
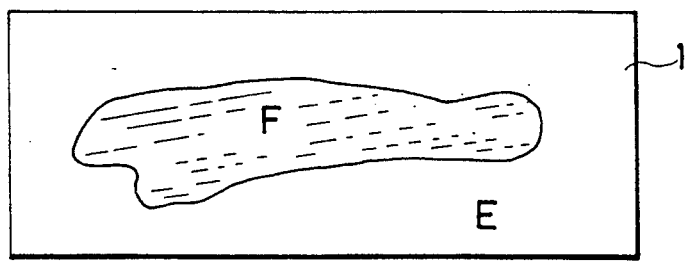
FIG. 9 is a plane view of a conventional device showing a bad appearance due to be deformation in FIG. 8.

When each two-layer LCDDs applying respectively two kinds of spacers are bent as shown in FIG. 5, the devices can be bent without unreasonable stress because they have a space 4 lager than size of the spacers 5.

When both two-layer LCDDs were left alone for 240 hours in an atmosphere of a temperature of 40° C. and humidity of 90%, there was no Newton ring, no optical interference fringe and no bad appearance of the devices due to uneven light transmission caused by the contact of the panel units.

On the other hand, nine conventional two layer LCDDs with a viewing area of 90×40 mm and having no spacers were prepared and left for 48 hours in an atmosphere of a temperature of 40° C. and humidity of 90%. As a result, smears of a size 5 to 70 mm² due to uneven light transmission caused by the contacts of the panels were found in all nine devices and when they were left alone for 240 hours in the atmosphere, the size increased to 100 to 800 mm².

What is claimed is:

1. A multilayer liquid crystal display device comprising at least two superposed liquid crystal panel units having plastic film substrates, fixing parts disposed between the adjacent panel units along peripheral portions of the units and a plurality of spacers sized not larger than 50 μm, dispersed between facing surfaces of the adjacent units and fixed to the surface.

2. A multilayer liquid crystal display device according to claim 1, wherein said spacers are fixed to a viewing area of one of said facing surfaces.

3. A multilayer liquid crystal display device according to claim 1, wherein a dispersion density of said spacers is 10 to 40 particles/mm².

4. A multilayer liquid crystal display device according to claim 1, wherein said size of the spacers is smaller than a space formed between the adjacent panel units.

5. A multilayer liquid crystal display device according to claim 1, wherein a light transmission of said spacers at a wavelength of 350 to 800 nm is not higher than 90%.

6. A multilayer liquid crystal display device according to claim 1, wherein said plastic film is a polyethylene telephthalate film.

* * * * *

UNITED STATES PATENT AND TRADEMARK OFFICE
CERTIFICATE OF CORRECTION

PATENT NO. : 5,029,985
DATED : July 9, 1991
INVENTOR(S) : Takumi Suzuki et al.

It is certified that error appears in the above-identified patent and that said Letters Patent is hereby corrected as shown below:

ON THE TITLE PAGE:
The Foreign Application Priority Data is incorrect, should be, --May 19, 1988 [JP]   Japan ......................63-65126

Jan. 9, 1989 [JP]   Japan .......................1-1267--.

Signed and Sealed this

Tenth Day of November, 1992

Attest:

DOUGLAS B. COMER

*Attesting Officer*  *Acting Commissioner of Patents and Trademarks*